United States Patent
Boh et al.

(10) Patent No.: US 9,727,308 B2
(45) Date of Patent: *Aug. 8, 2017

(54) SORTING MULTIPLE RECORDS OF DATA USING RANGES OF KEY VALUES

(71) Applicant: International Business Machines Corporation, Armonk, NY (US)

(72) Inventors: Ritsuko Boh, Chiba (JP); Noriaki Kohno, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/851,127

(22) Filed: Sep. 11, 2015

(65) Prior Publication Data

US 2015/0378675 A1    Dec. 31, 2015

Related U.S. Application Data

(63) Continuation of application No. 14/188,746, filed on Feb. 25, 2014, now Pat. No. 9,213,782, which is a
(Continued)

(30) Foreign Application Priority Data

Jun. 23, 2010  (JP) ................................. 2010-142973

(51) Int. Cl.
    *G06F 17/30*    (2006.01)
    *G06F 7/08*     (2006.01)

(52) U.S. Cl.
    CPC .......... *G06F 7/08* (2013.01); *G06F 17/30336* (2013.01); *G06F 17/30486* (2013.01); *G06F 17/30946* (2013.01)

(58) Field of Classification Search
    CPC ................................. G06F 17/00; G06F 17/30
    See application file for complete search history.

(56) References Cited

U.S. PATENT DOCUMENTS 5,117,495 A * 5/1992 Liu ........................... G06F 7/24
5,924,091 A * 7/1999 Burkhard .................. G06F 7/24
(Continued)

FOREIGN PATENT DOCUMENTS

JP      1994-0028386 A    2/1994
JP      1994-0044285 A    2/1994
(Continued)

OTHER PUBLICATIONS

U.S. Appl. No. 14/851,538, filed Sep. 11, 2015.
(Continued)

*Primary Examiner* — Farhan Syed
(74) *Attorney, Agent, or Firm* — Schmeiser, Olsen & Watts, LLP; John Pivnichny

(57) ABSTRACT

A method and system for sorting data of an input file containing multiple records associated with multiple tables of a database. The multiple records include key values. The key values are segmented into ranges of key values for each table. Each range of key values for each table is a segment having a segment value. Multiple key values are selected for the multiple records. A block number, which contains a unique permutation of the segment values of the segments, is generated. The segment values denote the ranges of key values encompassing the multiple key values in each record. A sort key value for each record is ascertained, based on the generated block number for each record, and added to each record. The multiple records are sorted according to the sort key values in the multiple records. The sorted multiple records are stored in an output file.

20 Claims, 12 Drawing Sheets

Related U.S. Application Data continuation of application No. 13/109,060, filed on May 17, 2011, now Pat. No. 8,725,734.

(56) References Cited

U.S. PATENT DOCUMENTS

| | | | | |
|---|---|---|---|---|
| 6,421,662 | B1* | 7/2002 | Karten | G06F 17/30324 |
| 6,571,244 | B1* | 5/2003 | Larson | G06F 17/30961 |
| | | | | 707/753 |
| 6,697,800 | B1* | 2/2004 | Jannink | G06F 17/30 |
| 6,711,562 | B1* | 3/2004 | Ross | G06F 17/30327 |
| | | | | 707/741 |
| 6,760,746 | B1* | 7/2004 | Schneider | G06Q 10/06 |
| | | | | 709/203 |
| 7,054,893 | B2 | 5/2006 | Mogi et al. | |
| 7,299,243 | B2* | 11/2007 | Maxfield | G06F 17/30595 |
| 7,720,876 | B2* | 5/2010 | Maxfield | G06F 17/30595 |
| | | | | 707/636 |
| 8,108,355 | B2* | 1/2012 | Zhang | G06F 17/30336 |
| | | | | 707/673 |
| 8,190,601 | B2* | 5/2012 | Ahari | G06F 17/30702 |
| | | | | 707/722 |
| 8,346,778 | B2* | 1/2013 | Ganesh | G06F 11/1474 |
| | | | | 707/640 |
| 8,589,357 | B2* | 11/2013 | Radhakrishnan | G06F 17/30551 |
| | | | | 707/638 |
| 8,595,248 | B2* | 11/2013 | Ganesh | G06F 17/30 |
| | | | | 707/640 |
| 8,725,734 | B2 | 5/2014 | Boh et al. | |
| 8,775,365 | B2* | 7/2014 | Hatami-Hanza | G06F 17/30 |
| | | | | 707/603 |
| 8,990,347 | B2* | 3/2015 | Schneider | G06Q 10/06 |
| | | | | 707/708 |
| 2003/0056082 | A1* | 3/2003 | Maxfield | G06F 17/30595 |
| | | | | 712/4 |
| 2004/0117358 | A1* | 6/2004 | von Kaenel | G06F 17/30241 |
| 2008/0059607 | A1* | 3/2008 | Schneider | G06Q 10/06 |
| | | | | 709/218 |
| 2008/0098045 | A1* | 4/2008 | Radhakrishnan | G06F 17/30551 |
| 2008/0104102 | A1* | 5/2008 | Zhang | G06F 17/30336 |
| 2009/0292679 | A1* | 11/2009 | Ganesh | G06F 17/30 |
| 2010/0030826 | A1* | 2/2010 | Kohno | G06F 11/1662 |
| | | | | 707/E17.005 |
| 2010/0299343 | A1* | 11/2010 | Ahari | G06F 17/30702 |
| | | | | 707/759 |
| 2011/0093440 | A1* | 4/2011 | Asakura | G06F 11/1471 |
| | | | | 707/685 |
| 2011/0218960 | A1* | 9/2011 | Hatami-Hanza | G06F 17/30 |
| | | | | 707/603 |
| 2012/0209835 | A1* | 8/2012 | Ahari | G06F 17/30702 |
| | | | | 707/723 |
| 2014/0067767 | A1* | 3/2014 | Ganesh | G06F 17/30 |
| | | | | 707/683 |
| 2015/0201039 | A1* | 7/2015 | Schneider | G06Q 10/06 |
| | | | | 709/217 |
| 2016/0004503 | A1 | 1/2016 | Boh et al. | |

FOREIGN PATENT DOCUMENTS

| | | |
|---|---|---|
| JP | 1998-0049600 A | 2/1998 |
| JP | 1999-0003260 A | 1/1999 |
| JP | H113260 | 1/1999 |
| JP | 1999-0088199 A | 3/1999 |
| JP | H1188199 | 3/1999 |
| JP | 2001-0331353 A | 11/2001 |
| JP | 2002-0297897 A | 10/2002 |
| JP | 2003-0150414 A | 5/2003 |
| JP | 2006031631 | 2/2006 |
| JP | 2008-0165622 A | 7/2008 |

OTHER PUBLICATIONS

IDS, JPO Office Action Dec. 17, 2013, 1 page.
Notice of Allowance (Mail Date Jan. 3, 2014) for U.S. Appl. No. 13/109,060, filed May 17, 2011.
Response (Filed Oct. 11, 2013) for U.S. Appl. No. 13/109,060, filed May 17, 2011.
Office Action (Mail Date Jul. 16, 2013) for U.S. Appl. No. 13/109,060, filed May 17, 2011.
Response (Filed May 20, 2013) for U.S. Appl. No. 13/109,060, filed May 17, 2011.
Office Action (Mail Date Feb. 19, 2013) for U.S. Appl. No. 13/109,060, filed May 17, 2011.
Response (Filed Dec. 17, 2012) for U.S. Appl. No. 13/109,060, filed May 17, 2011.
Office Action (Mail Date Sep. 17, 2012) for U.S. Appl. No. 13/109,060, filed May 17, 2011.
Office Action (Mail Date Mar. 19, 2015) for U.S. Appl. No. 14/188,746, filed Feb. 25, 2014.
Amendment (Jun. 18, 2015) for U.S. Appl. No. 14/188,746, filed Feb. 25, 2014.
Notice of Allowance (Mail Date Aug. 5, 2015) for U.S. Appl. No. 14/188,746, filed Feb. 25, 2014.
Graefe et al., Self-selecting, self-tuning, incrementally optimized indexes, in Proceedings of the 13th International Conference on Extending Database Technology, pp. 371-381, ACM 2010.
Bentley et al., Data structures for range searching, ACM Computing Surveys (CSUR) 11, No. 4, (1979): 397-409.
Office Action (Jun. 30, 2016) for U.S. Appl. No. 14/851,538, filed Sep. 11, 2015.
Amendment (Sep. 29, 2016) for U.S. Appl. No. 14/851,538, filed Sep. 11, 2015.
Notice of Allowance (Jan. 11, 2017) for U.S. Appl. No. 14/851,538, filed Sep. 11, 2015.
312 amendment (Feb. 8, 2017) for U.S. Appl. No. 14/851,538, filed Sep. 11, 2015.

* cited by examiner

| SORT KEY | | RECORD DATA | | | |
|---|---|---|---|---|---|
| BLOCK'S ORDINAL VALUE | INTRA-BLOCK KEY VALUE | KEY1 | KEY2 | KEY3 | |
| 373 | 6860 | 3918 | 4085 | 6860 | ..... |
| 298 | 9804 | 2618 | 7322 | 9804 | ..... |
| 340 | 1211 | 3929 | 1211 | 6480 | ..... |
| 464 | 8033 | 4665 | 2065 | 8033 | ..... |
| 125 | 3143 | 1155 | 1862 | 3143 | ..... |
| 518 | 7785 | 5951 | 6974 | 7785 | ..... |
| 231 | 8465 | 2882 | 1149 | 8465 | ..... |
| 404 | 4608 | 4030 | 6816 | 4608 | ..... |
| 400 | 4858 | 4858 | 6557 | 669 | ..... |
| 011 | 852 | 122 | 1777 | 852 | ..... |
| ..... | ..... | ..... | ..... | ..... | ..... |

FIG. 6

| BLOCK NUMBER | KEY1 | KEY2 | KEY3 | SORT KEY | ACCESS TO TABLE 1 | ACCESS TO TABLE 2 | ACCESS TO TABLE 3 |
|---|---|---|---|---|---|---|---|
| 000 | 0000~0999 | 0000~0999 | 0000~0999 | KEY3 | RANDOM (LOW SPEED) | RANDOM (LOW SPEED) | SEQUENTIAL (HIGH SPEED) |
| 001 | 0000~0999 | 0000~0999 | 1000~1999 | KEY3 | BUFFER HIT (HIGH SPEED) | BUFFER HIT (HIGH SPEED) | SEQUENTIAL (HIGH SPEED) |
| 002 | 0000~0999 | 0000~0999 | 2000~2999 | KEY3 | BUFFER HIT (HIGH SPEED) | BUFFER HIT (HIGH SPEED) | SEQUENTIAL (HIGH SPEED) |
| ... | ... | ... | ... | ... | ... | ... | ... |
| 009 | 0000~0999 | 0000~0999 | 9000~9999 | KEY3 | BUFFER HIT (HIGH SPEED) | BUFFER HIT (HIGH SPEED) | SEQUENTIAL (HIGH SPEED) |
| 019 | 0000~0999 | 1000~1999 | 9000~9999 | KEY2 | BUFFER HIT (HIGH SPEED) | SEQUENTIAL (HIGH SPEED) | BUFFER HIT (HIGH SPEED) |
| 010 | 0000~0999 | 1000~1999 | 0000~0999 | KEY3 | BUFFER HIT (HIGH SPEED) | BUFFER HIT (HIGH SPEED) | SEQUENTIAL (HIGH SPEED) |
| 011 | 0000~0999 | 1000~1999 | 1000~1999 | KEY3 | BUFFER HIT (HIGH SPEED) | BUFFER HIT (HIGH SPEED) | SEQUENTIAL (HIGH SPEED) |
| ... | ... | ... | ... | ... | ... | ... | ... |
| 099 | 0000~0999 | 9000~9999 | 9000~9999 | KEY3 | BUFFER HIT (HIGH SPEED) | BUFFER HIT (HIGH SPEED) | SEQUENTIAL (HIGH SPEED) |
| 090 | 0000~0999 | 9000~9999 | 0000~0999 | KEY3 | BUFFER HIT (HIGH SPEED) | BUFFER HIT (HIGH SPEED) | SEQUENTIAL (HIGH SPEED) |
| 190 | 1000~1999 | 9000~9999 | 0000~0999 | KEY1 | SEQUENTIAL (HIGH SPEED) | BUFFER HIT (HIGH SPEED) | BUFFER HIT (HIGH SPEED) |
| 191 | 1000~1999 | 9000~9999 | 1000~1999 | KEY3 | BUFFER HIT (HIGH SPEED) | BUFFER HIT (HIGH SPEED) | SEQUENTIAL (HIGH SPEED) |
| ... | ... | ... | ... | ... | ... | ... | ... |

FIG. 8

SORTING MULTIPLE RECORDS OF DATA USING RANGES OF KEY VALUES

This application is a continuation application claiming priority to Ser. No. 14/188,746, filed Feb. 25, 2014, now U.S. Pat. No. 9,213,782, issued Dec. 15, 2015, which is a continuation application of Ser. No. 13/109,060, filed on May 17, 2011, U.S. Pat. No. 8,725,734, issued May 13, 2014.

FIELD OF THE INVENTION

The present invention relates generally to an apparatus and method for sorting data, and more particularly, the present invention relates to an apparatus and method for sorting input data as data having multiple keys and input to processing for accessing multiple database tables using the multiple keys.

BACKGROUND OF THE INVENTION

In a computer system of a financial institution or the like, data are usually input from online terminals to process the data. However, for example, when vast amounts of information are to be registered, input of data from online terminals may be out of touch with reality. In such a case, a file including data to be input may be created and this file may be input to perform bulk data processing (also called "center-cut processing") on the data.

In the computer system of the financial institution or the like, volumes of millions of records need to be processed in block within a set period of time, and the performance of bulk data processing becomes an issue. In bulk data processing, since processing similar to the case where data are input from online terminals is performed, there is a need to access tables of various databases at random depending on input data. Thus, when read operations occur at random in database processing, more time is required for one read operation, and this has a great impact on the performance.

Therefore, there have been conventionally proposed techniques for speeding up processing for databases.

In Japanese Patent Application Publication No. 11-3260, when a query request is issued, if a transaction to process the query is aware of the sequence of records in a block concerned, the transaction will determine a sequence identifier to determine whether the sorted state can be reused in the transaction. Then, when it is determined that the transaction cannot process the query or the transaction cost is high, the block is occupied, records in the block are sorted, the sequence identifier at the time of sorting is updated, and the block is released after the sorted state of the block is changed.

In Japanese Patent Application Publication No. 2008-165622, a query received is optimized to create a transaction tree built with relational algebra. Tasks capable of being processed directly from this transaction tree in order of topological sort are found, these tasks are grouped based on the relations between databases the tasks access, each group in which tasks performing processing on a common relation are put together is inserted into a queue of groups, and groups are extracted from the queue of groups according to the number of processes available in an operating system to cause the respective processes to execute the groups using multi-operation method.

There have also been proposed techniques for performing processing in a memory or database efficiently.

In Japanese Patent Application Publication No. 11-88199, a data area into which data to be sorted is written and an address area in which an address value indicative of the next write destination address is written beforehand are formed for each of addresses of a memory including a first buffer area and a second buffer area, and each of the addresses is accessed sequentially according to the address value from the address area of the address upon writing data to write the data in predetermined order, where when data is written into the first buffer area, the second buffer area is sequentially accessed, while when data is written into the second buffer area, the first buffer area is sequentially accessed, thus reading data in an array different from the array of input data.

In Japanese Patent Application Publication No. 2003-150414, a data position management server collects and stores volume physical storage position management information and physical storage device operation information from a storage device, collects and stores required information from schema information in the DBMS of a DB host, collects and stores mapping information in the DB host and virtual volume information in a virtual volume switch, and acquires and stores execution history information from the DB host to determine a data relocation plan having good performance characteristics based on these pieces of information and issue a data migration instruction to realize it.

SUMMARY OF THE INVENTION

The present invention provides a method for sorting data of an input file stored on a first tangible storage device, said input file comprising multiple records associated with multiple tables of a database, each record of the multiple records comprising a plurality of key values, said method comprising:

segmenting the plurality of key values in the multiple records associated with each table into ranges of key values for each table, each range of key values for each table denoted as a segment having an associated segment value;

selecting multiple key values for each record of the multiple records, said multiple key values being selected in association with the tables of the multiple tables;

generating, for each record of the multiple records, a block number comprising a unique permutation of the segment values of the segments, said segment values respectively denoting the ranges of key values encompassing the multiple key values;

ascertaining, for each record of the multiple records, a sort key value based on the generated block number for each record of the multiple records;

adding, to each record of the multiple records, the sort key value ascertained for each record of the multiple records; and after said adding the sort key value to all records of the multiple records, sorting the multiple records according to the sort key values added to the multiple records; and storing the sorted multiple records in an output file on a second tangible storage device The present invention provides a computer program product, comprising a computer readable tangible storage medium having a computer readable program code stored therein, said program code configured to be executed by a processor of a computer system to implement a method for sorting data of an input file stored on a first tangible storage device, said input file comprising multiple records associated with multiple tables of a database, each record of the multiple records comprising a plurality of key values, said method comprising:

segmenting the plurality of key values in the multiple records associated with each table into ranges of key values for each table, each range of key values for each table denoted as a segment having an associated segment value;

selecting multiple key values for each record of the multiple records, said multiple key values being selected in association with the tables of the multiple tables;

generating, for each record of the multiple records, a block number comprising a unique permutation of the segment values of the segments, said segment values respectively denoting the ranges of key values encompassing the multiple key values;

ascertaining, for each record of the multiple records, a sort key value based on the generated block number for each record of the multiple records;

adding, to each record of the multiple records, the sort key value ascertained for each record of the multiple records; and after said adding the sort key value to all records of the multiple records, sorting the multiple records according to the sort key values added to the multiple records; and storing the sorted multiple records in an output file on a second tangible storage device.

The present invention provides a computer system comprising a processor, a memory unit, and a computer readable tangible storage medium, said storage medium containing program code configured to be executed by the processor via the memory unit to implement a method for sorting data of an input file stored on a first tangible storage device, said input file comprising multiple records associated with multiple tables of a database, each record of the multiple records comprising a plurality of key values, said method comprising:

segmenting the plurality of key values in the multiple records associated with each table into ranges of key values for each table, each range of key values for each table denoted as a segment having an associated segment value;

selecting multiple key values for each record of the multiple records, said multiple key values being selected in association with the tables of the multiple tables;

generating, for each record of the multiple records, a block number comprising a unique permutation of the segment values of the segments, said segment values respectively denoting the ranges of key values encompassing the multiple key values;

ascertaining, for each record of the multiple records, a sort key value based on the generated block number for each record of the multiple records;

adding, to each record of the multiple records, the sort key value ascertained for each record of the multiple records; and after said adding the sort key value to all records of the multiple records, sorting the multiple records according to the sort key values added to the multiple records; and storing the sorted multiple records in an output file on a second tangible storage device.

BRIEF DESCRIPTION OF THE DRAWINGS

FIG. 6 is a diagram showing an example of the content of an input file with sort key output from the preprocessing unit in the bulk data processing system of embodiments of the present invention.

FIG. 8 is a diagram for describing the operation of the bulk data processing unit in the bulk data processing system of embodiments of the present invention.

DETAILED DESCRIPTION OF THE INVENTION

Figures 1A, 1B:
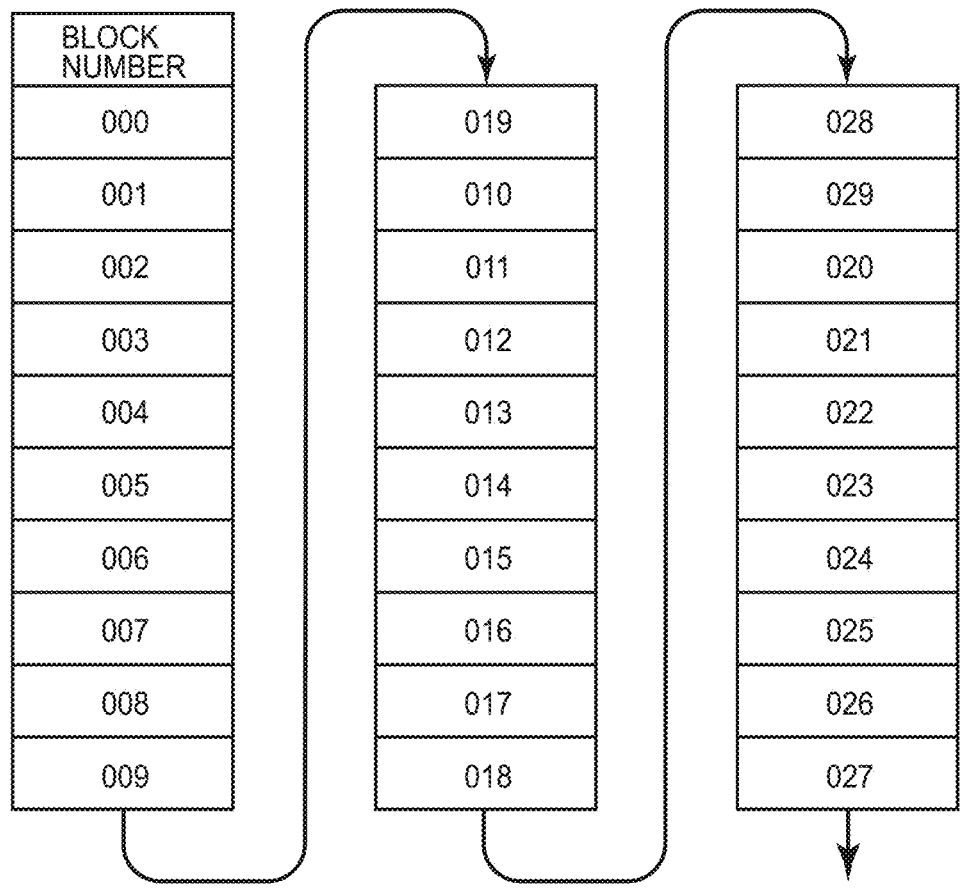
FIG. 1A is a diagram for describing assignment of segment values according to embodiments of the present invention.
FIG. 1B is a diagram showing how to arrange block numbers according to embodiments of the present invention.

Existing RDB (Relational DataBase) products have a dynamic sequential access function for data reading from databases. This is a function to change dynamically from random access to sequential access when a reading pattern of records is determined that records to be read are roughly stored in order. In this sequential access function, since a large volume of continuous data can be read into a buffer pool in one I/O operation, the time required to read data can be reduced. In other words, if the sorting order of input data in bulk data processing is almost the same as the sorting order of data in each database table, random reading can be changed to sequential reading, and hence processing performance can be dramatically improved.

The present invention speeds up access to database tables by taking the sorting order of input data into account.

The present invention provides an apparatus for sorting input data as data having a multiple keys and input to processing for accessing a multiple database tables using the multiple keys, the apparatus comprising: a decision section for deciding on a segment to which each of key values that can be taken by each of the multiple keys belongs so that data in the database tables corresponding to the key value belonging to each segment will have a size readable into a buffer; and a sorting section for sorting a block of the input data with the multiple keys taking key values belonging to the same segment, respectively, so that keys other than one key in the multiple keys will take key values belonging to the same segment between adjacent blocks to sort data in the block with the one key.

Here, the apparatus may be configured such that the decision section assigns a segment value to the segment, and based on a multiple segment values assigned respectively to a multiple segments to which a multiple key values taken by the multiple keys belong, the sorting section generates sequence information indicative of the order of blocks so that the keys other than the one key will take key values belonging to the same segment between the adjacent blocks to sort the block using the sequence information.

The apparatus may also be such that the segment value is an integer from 0 to (s-1), and the sorting section arranges the multiple segment values to generate identification information on the block, and calculates, using the following equation, a multiple ordinal values to be arranged to generate the sequence information to convert the identification information to the sequence information:

$$(\text{Ordinal Value 1} \ \text{Ordinal Value 2} \ \ldots \ \text{Ordinal Value } n) =$$
$$(\text{Segment Value 1} \ \text{Segment Value 2} \ \ldots \ \text{Segment Value } n) \begin{pmatrix} 1 & 1 & \ldots & 1 \\ 0 & 1 & \ldots & 1 \\ \ldots & \ldots & \ldots & \ldots \\ 0 & 0 & \ldots & 1 \end{pmatrix}$$

where s is a natural number, segment value i denotes the i-th segment value of the identification information, ordinal value i denotes the i-th ordinal value of the sequence information, and the ordinal value is expressed as a coset representative for s as the law.

Alternatively, the sorting section uses the following equation to decide on position p of an ordinal value corresponding to the one key in the sequence information:

$$p = \{k | (\text{Ordinal Value } k > 0) \char`\^ (\forall m > k, \text{Ordinal Value } m = 0)\}$$

where ordinal value i denotes the i-th ordinal value of the sequence information.

Further, the apparatus may be configured such that the input data includes multiple records, and the sorting section adds, to each of the multiple records, the sequence information obtained based on multiple key values taken by the multiple keys in each record, and a sort key including a key value taken by the one key in the record, and sorts the multiple records with the sort key added to each record.

Further, this apparatus may further comprise a selection section for selecting, from M keys contained in the input data, N keys as the multiple keys that meet a condition for determining that data in the database tables are readable sequentially (M and N are integers, where M>N).

The present invention also provides an apparatus for sorting input data as data including multiple records and to be subjected to bulk data processing for performing processing on the multiple records in block to access multiple database tables using M keys contained in each of the multiple records, the apparatus comprising: a decision section for deciding on a segment to which each of key values that can be taken by each of the M keys belongs so that data in the database tables corresponding to the key value belonging to each segment will have a size readable into a buffer; a selection section for selecting, from the M keys, N keys that meet a condition for determining that data in the database tables are readable sequentially; an addition section for adding, to each of the multiple records, sequence information generated based on N segment values respectively assigned to N segments to which N key values taken by the N keys in each record belong and indicative of the order of blocks of the input data so that keys other than one key in the N keys will take key values belonging to the same segment between adjacent blocks, and a sort key including a key value taken by the one key in each record; and a sorting section for sorting the multiple records with the sort key added to each of the multiple records (M and N are integers, where M>N).

Further, the present invention provides a system for performing processing to access multiple database tables using multiple keys in response to input of input data having the multiple keys, the system comprising: a decision section for deciding on a segment to which each of key values that can be taken by each of the multiple keys belongs so that data in the database tables corresponding to the key value belonging to each segment will have a size readable into a buffer; a generation section for sorting a block of the input data with the multiple keys taking key values belonging to the same segment, respectively, so that keys other than one key in the multiple keys will take key values belonging to the same segment between adjacent blocks to sort data in the block with the one key in order to generate sorted input data; and a processing section for performing the processing in response to input of the sorted input data generated by the generation section.

Further, the present invention provides a method of sorting input data as data having multiple keys and input to processing for accessing multiple database tables using the multiple keys, the method comprising: deciding on a segment to which each of key values that can be taken by each of the multiple keys belongs so that data in the database tables corresponding to the key value belonging to each segment will have a size readable into a buffer; and sorting a block of the input data with the multiple keys taking key values belonging to the same segment, respectively, so that keys other than one key in the multiple keys will take key values belonging to the same segment between adjacent blocks to sort data in the block with the one key.

Further, the present invention provides a program causing a computer to function as an apparatus for sorting input data as data having multiple keys and input to processing for accessing multiple database tables using the multiple keys, the program causing the computer to function as: a decision section for deciding on a segment to which each of key values that can be taken by each of the multiple keys belongs so that data in the database tables corresponding to the key value belonging to each segment will have a size readable into a buffer; and a sorting section for sorting a block of the input data with the multiple keys taking key values belonging to the same segment, respectively, so that keys other than one key in the multiple keys will take key values belonging to the same segment between adjacent blocks to sort data in the block with the one key.

According to the present invention, access to database tables can be speeded up by taking the sorting order of input data into account.

The present invention is configured to presort input data in bulk data processing by special logic using keys of multiple tables so that multiple database tables (hereinafter called "tables") can be sequentially accessed in the bulk data processing. The presorting by this special logic is called "special sorting" below.

The idea of the special sorting is as follows.

First, key values for database access in input data in bulk data processing are assigned segment values according to the range of key values.

FIG. 1A shows the assignment of the segment values.

Here, it is assumed that the table key values take on values from "0000" to "9999." Then, as shown, segment value "0" is assigned to key values from "0000" to "0999," segment value "1" is assigned to key values from "1000" to "1999," and segment value "9" is assigned to key values from "9000" to "9999," respectively.

Likewise, segment values are assigned to keys of multiple tables to be accessed in bulk data processing. Then, some segment values are combined as a block number as an example of block identification information, and input data in bulk data processing are classified by block number. For example, if there are three keys, the number of segment values is also three, so that multiple blocks identified by block numbers such as "000," "001," "002," . . . , "999" are made up. In this case, one block consists of multiple records corresponding to the same segment value, in which data close in key value to each other are put together.

Next, the multiple blocks are so arranged that only one segment value included in block numbers of adjacent two blocks varies.

FIG. 1B shows how to arrange the block numbers in this case. In this specification, it is assumed that each of the multiple segment values constructing a block number is distinguished depending on the ordinal number of the segment value that indicates its position from the left.

As shown, the blocks with the number from "000" to "009" are so arranged that only the third segment value is changed. If the block that follows "009" is "010," two segment values will vary. To avoid this, the block "019" follows so that only the second segment value is changed. The blocks from "010" to "018" are so arranged that only the third segment value is changed again. The block that follows "018" is "028" so that only the second segment value is changed. The blocks from "029" to "027" are so arranged that only the third segment value is changed again.

Next, data in a block are sorted using a key with a segment value changed between the block number of the block and the block number of the previous block. For example, when the block number is changed from "008" to "009," the third key is used, while when the block number is changed from "009" to "019," the second key is used to sort data in the block.

Thus, input data in bulk data processing are divided into blocks using sets of segment values for the multiple keys, and blocks are arranged so that only a segment value corresponding to one key will vary between adjacent blocks. In the block, data are sorted based on a key corresponding to a segment value changed from that in the previous block. This enables sequential access to a table corresponding to the key used for sorting in the block, enabling high-speed reading. On the other hand, tables corresponding to keys with no change in segment value between blocks are accessed at random. However, since the range of keys are the same as that in the previous block and data in the previous block have been read in the buffer pool during processing on the previous block, the buffer is hit (i.e., accessed) and hence high-speed reading can be achieved.

Figure 2:
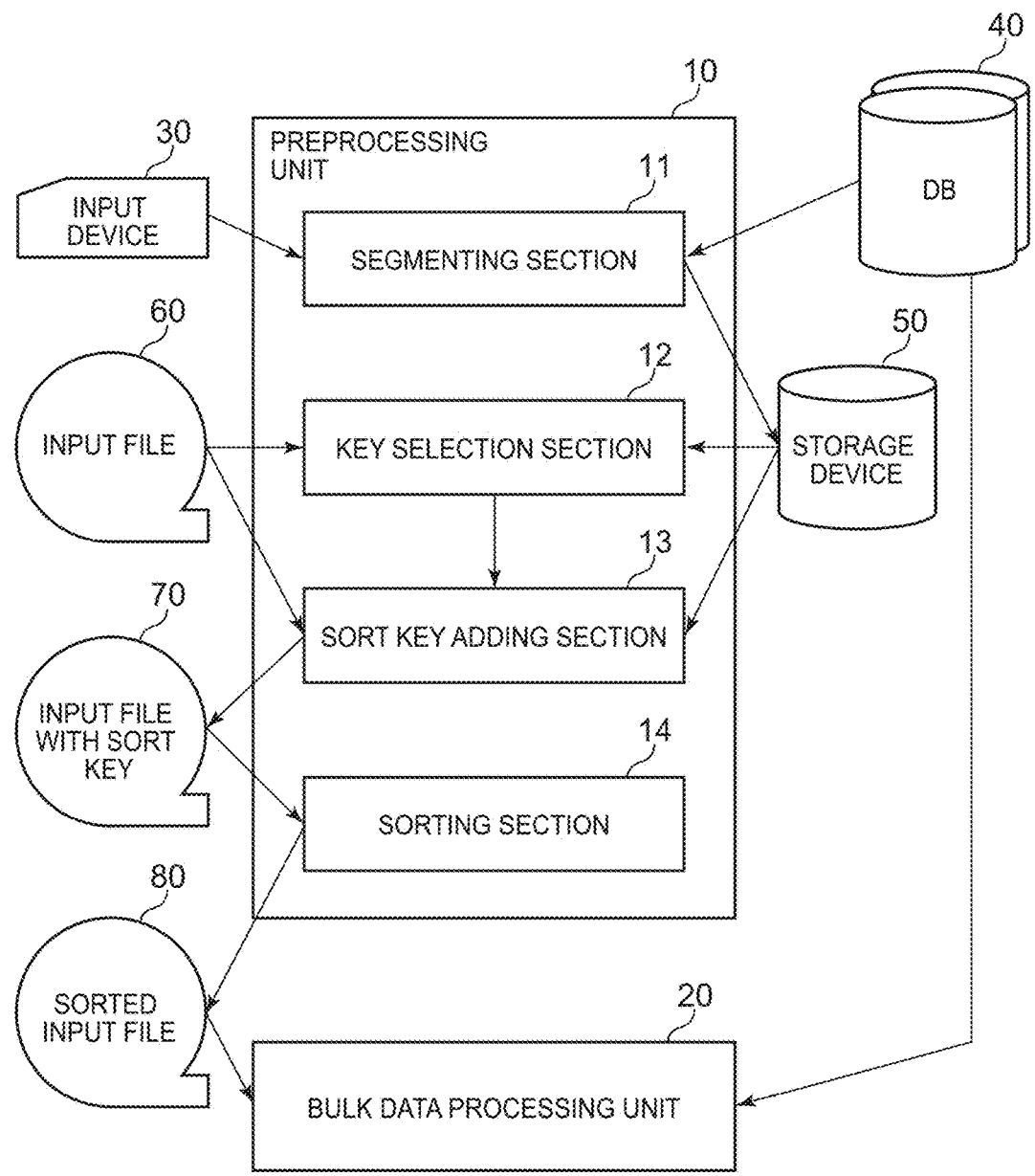
FIG. 2 is a block diagram showing a configuration example of a bulk data processing system according to embodiments of the present invention.

FIG. 2 is a block diagram showing a configuration of a bulk data processing system according to embodiments of the present invention.

As shown, the bulk data processing system includes a preprocessing unit 10 and a bulk data processing unit 20.

The bulk data processing system also includes an input device 30, a database (DB) 40, a storage device 50, an input file 60, an input file 70 with sort key, and a sorted input file 80.

The preprocessing unit 10 is an apparatus for sorting data in the input file 60 to output the sorted input file 80 in order to perform bulk data processing at high speed without changing the application logic of the bulk data processing unit 20. For example, this preprocessing unit 10 is implemented by a mainframe or a PC (Personal Computer).

The bulk data processing unit 20 is an apparatus for reading data in the sorted input file 80 output from the preprocessing unit 10 in order of sorted data to perform bulk data processing. For example, this bulk data processing unit 20 is implemented by a mainframe. In the embodiment, the bulk data processing unit 20 is provided as an example of a processing section.

The input device 30 is a device for inputting various parameters into the preprocessing unit 10. For example, this input device 30 is implemented by a keyboard/mouse 90$i$ (see FIG. 9).

The DB 40 is a set of data to be a target for bulk data processing in the bulk data processing unit 20, including multiple RDB tables. DBMS (DataBase Management System) as software for table management and processing requests for access to tables may also be included in the DB 40. For example, this DB 40 is implemented by a magnetic disk device 90$g$ (see FIG. 9). In addition, when the DBMS is included, the DB 40 is implemented, for example, by a CPU 90$a$ (see FIG. 9) reading a DBMS program stored in the magnetic disk device 90$g$ (see FIG. 9) into a main memory 90$c$ (see FIG. 9) to run the DBMS program.

The storage device 50 is a device for storing information generated and used by the preprocessing unit 10. For example, this storage device 50 is implemented by the magnetic disk device 90$g$ (see FIG. 9).

The input file 60 is a file storing multiple records to be input into the bulk data processing unit 20. For example, this input file 60 may be stored in a magnetic tape or the magnetic disk device 90$g$ (see FIG. 9). In the embodiment, the input file 60 is used as an example of input data.

The input file 70 with sort key is a file generated by the preprocessing unit 10 adding a sort key to multiple records stored in the input file 60. For example, this input file 70 with sort key may also be stored in the magnetic tape or the magnetic disk device 90$g$ (see FIG. 9).

The sorted input file 80 is a file generated by sorting, based on the sort key, the multiple records stored in the input file 70 with sort key. For example, this sorted input file 80 may also be stored in the magnetic tape or the magnetic disk device 90$g$ (see FIG. 9). In the embodiment, the sorted input file 80 is used as an example of sorted input data.

Next, a functional configuration of the preprocessing unit 10 will be described in more detail.

As shown in FIG. 2, the preprocessing unit 10 includes a segmenting section 11, a key selection section 12, a sort key adding section 13, and a sorting section 14.

The segmenting section 11 acquires information, such as key name, buffer pool size, the number of records, record length and key value, on tables to be referred to in bulk data processing to decide on a segmenting method on a table-by-table basis. The segmenting section 11 also stores, in the storage device 50, the information obtained when deciding on the segmenting method. In the embodiment, the segmenting section 11 is provided as an example of a decision section for deciding on segments.

Based on the number of records in the input file 60 and the information stored in the storage device 50, the key selection section 12 selects multiple keys used for special sorting. In the embodiment, the key selection section 12 is provided as an example of a selection section for selecting N keys.

The sort key adding section 13 reads data in the input file 60, and based on the multiple keys selected by the key selection section 12, generates a sort key for each record and indicative of the sorting order to perform high-speed processing. Then, the sort key adding section 13 adds the sort keys to the records to generate the input file 70 with sort key. In the embodiment, the sort key adding section 13 is provided as an example of a function to add a sort key for the sorting section, an addition section for adding the sort key, and a generation section for generating sorted input data.

The sorting section 14 sorts all the data in the input file 70 with sort keys generated by the sort key adding section 13. As a result, data sorted in order of enabling high-speed processing can be obtained. Note that, since this sorting section 14 has only to perform sorting in ascending order of sort keys, an existing sort utility may be used to perform sorting. In the embodiment, the sorting section 14 is provided as an example of a sorting section.

Next, the operation of the bulk data processing system in the embodiment will be described.

First, the operation of the segmenting section 11 of the preprocessing unit 10 will be described. This segmenting section 11 acquires information on tables as candidates to be used for special sorting to decide on the number of segments and a segmenting method appropriate for performing special sorting on a table-by-table basis.

Figure 3:
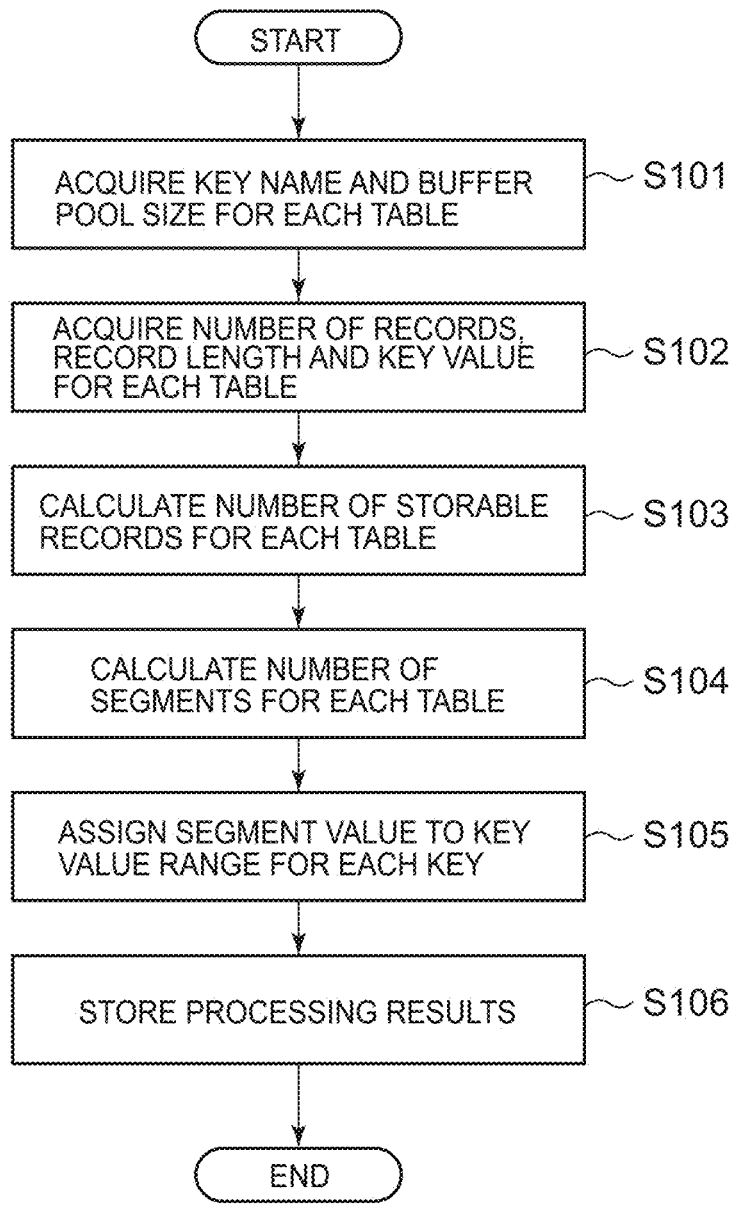
FIG. 3 is a flowchart showing an example operation of a segmenting section of a preprocessing unit in the bulk data processing system of embodiments of the present invention.

FIG. 3 is a flowchart showing an example operation of the segmenting section 11, according to embodiments of the present invention.

First, for each of multiple tables included in the input file 60 and used in bulk data processing, the table name of the table, the key name of the table, and the buffer pool size for the table in the DBMS are given as parameters from the input device 30. As a result, the segmenting section 11 acquires these pieces of information (step 101). The multiple keys become key candidates used for special sorting, but the keys actually used are selected by the key selection section 12.

Further, for each of tables used in bulk data processing, the segmenting section 11 acquires, from the DBMS, the number of records in the table, the record length of the table, and the key value taken by the key whose key name is acquired in step 101 (step 102).

This causes the segmenting section 11 to calculate, for each table, the number of records storable in the buffer pool (hereinafter called "the number of storable records") (step 103). In this case, if there is a dedicated buffer pool for each table, the number of storable records will be calculated using the following equation:

Number of Storable Records=Buffer Pool Size/Record Length.

In the above equation, the buffer pool size is acquired in step 101 and the record length is acquired in step 102.

Alternatively, if multiple tables share one buffer pool, the number of storable records may be calculated by the following equation:

Number of Storable Records=Buffer Pool Size/Record Length/Number of Tables Sharing Buffer Pool/Allowance Rate.

Further, the segmenting section 11 calculates the number of segments appropriate for special sorting on a table-by-table basis (step 104) according to the following equation:

Number of Segments=Number of Records/Number of Storable Records.

Note that digits to the right of the decimal point are rounded up.

In the above equation, the number of records is acquired in step 102, and the number of storable records is calculated in step 103.

Further, the segmenting section 11 decides on the range of key values to be included in each segment so that each segment will include almost the same number of records, and assigns a segment value beginning with "0" to each range (step 105). In this case, if the distribution of key values is uniform, key values between the largest key value and the smallest key value are divided equally by the number of segments and the segment value for a key value is determined according to the following formula:

Segment value=(key value−smallest key value for table)× number of segments/(largest key value for table−smallest key value for table+1). Note that all digits to the right of the decimal point are discarded. Here, although "1" is added to the denominator on condition that the increment of key value is "1," the increment of key value can be generally added. In the preceding formula for segment value, each key value is acquired in step 102, and the number of segments is calculated in step 104. Note that any "key value" within a given segment may be used in the preceding formula to compute the segment value of the given segment.

On the other hand, if the distribution of keys is not uniform, key information may be read to decide on the range of keys according to the following equation so that each segment will include almost the same number of records:

Segment value={k|Range Segment(k)≤Key Value<Range Segment(k+1)}.

For example, if certain table key values take on values in a range from "0000" to "9999" and is distributed uniformly, and the number of segments is "10," segment values are assigned to the ranges of key values as shown in FIG. 1A.

Finally, the segmenting section 11 stores these processing results in the storage device 50 so that the key selection section 12 and the sort key adding section 13 can use the processing results (step 106).

Since this processing in the segmenting section 11 is to decide on the characteristics of special sorting, the segmenting section 11 has only to perform the processing once without redoing the processing unless the number of records in the table or the distribution of keys changes. In other words, the processing in the segmenting section 11 may be skipped when the processing in the preprocessing unit 10 is redone.

Secondly, the operation of the key selection section 12 in the preprocessing unit 10 will be described. From the number of records in the input file 60 and information stored in the storage device 50, this key selection section 12 selects multiple keys used for special sorting. When data are divided into blocks with multiple keys, data in a block need to have such a density that the sequential access function of the RDB product can work. For example, suppose that the number of input records is 1,000 and the number of segments for each key is "10." In this case, even if data are divided into blocks with four keys, since the number of records in one block will be 1000 or so, it is highly likely that the sequential access function works. On the other hand, when the number of input records is 100,000 and the number of segments for each key is "10," if data are divided into blocks with four keys, the number of records in one block will be 10, the probability that the sequential access function works will be decreased. Therefore, the key selection section 12 operates to enable appropriate special sorting according to the number of input records.

Figure 4:
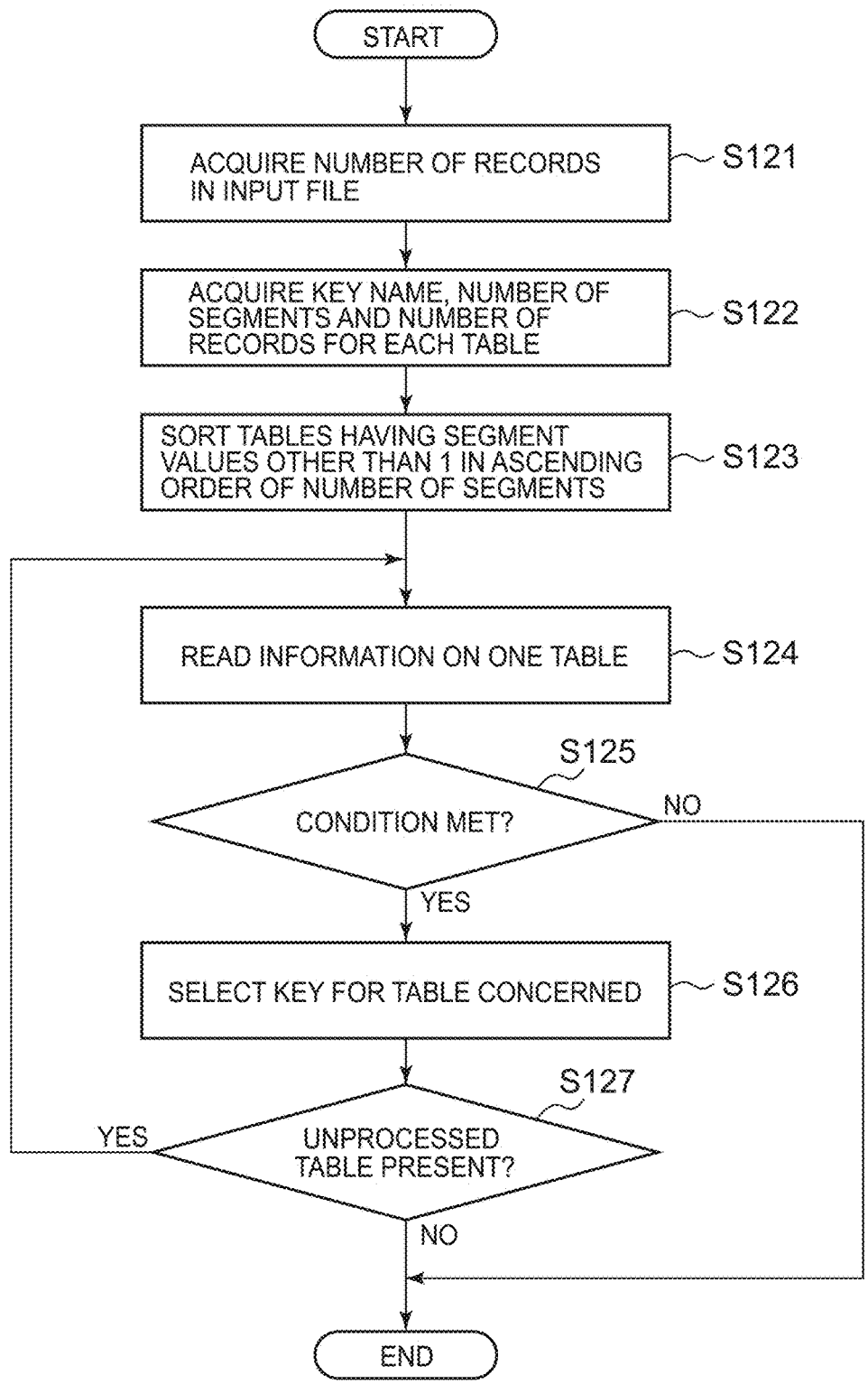
FIG. 4 is a flowchart showing an example operation of a key selection section of the preprocessing unit in the bulk data processing system of embodiments of the present invention.

FIG. 4 is a flowchart showing an example operation of the key selection section 12, according to embodiments of the present invention.

First, the key selection section 12 acquires the number of included records from the input file 60 (step 121).

The key selection section 12 also acquires the key name, the number of segments, and the number of records for each table stored by the segmenting section 11 in the storage device 50 (step 122).

Next, among the tables on which information is acquired in step 122, tables having values other than "1" as the number of segments are sorted in ascending order (step 123). In other words, since tables having "1" as the number of segments can always be buffer-hit and accessed at high speed, they are excluded from keys used for special sorting. Since the selection of tables with fewer segments has an advantage in meeting a condition in step 125 to be described later, the tables are sorted in ascending order of the number of segments.

Then, the key selection section 12 reads information on one table (step 124).

Here, in order to divide data into blocks with multiple keys so that the sequential access function will work, the following condition needs meeting:

Number of records in Input File/(Number of Segments 1×Number of Segments 2× . . . ×Number of Segments $n$)>max(Number of Records in Table $i$/Number of Segments $i$)/Coefficient.

Note that "Table i" denotes the i-th table, "Number of Segments i" denotes the number of segments in the i-th table, and "Max(X)" denotes the maximum value of X when i takes a value from 1 to n. Further, "Coefficient" is the number of pages from a page read immediately before the page read this time when the currently read page is handled as page-sequential. Here, the term "page" is the unit of storing data on a magnetic disk, and reading and writing are performed in this unit. In the case of a certain product, the coefficient is "16." In other words, if the page read this time is within 16 pages from the last read page, it is handled as page-sequential. Then, among eight pages continuously read, if five pages or more are page-sequential, sequential access will be dynamically started. Note that since "Coefficient" varies from product to product, a value appropriate for the DBMS product used is employed.

Thus, the key selection section 12 determines whether the above condition is met for the table on which information was read in step 124 (step 125). In the above condition, the number of records in the input file is acquired in step 121, and the number of segments i and the number of records in the table i are acquired in step 122.

As a result of determination in step 125, if the condition is met for the table on which information was read in step 124, the key selection section 12 selects a key for the table (step 126).

After that, the key selection section 12 determines whether there is any unprocessed table (step 127). If there is any unprocessed table, the procedure returns to step 124 to determine the condition in step 125 on the next table. Then, the procedure is repeated until the condition is no longer met in step 125 or no unprocessed table is present in step 127. As a result, a set of as many keys meeting the condition as possible is selected from the multiple keys.

Thirdly, the operation of the sort key adding section 13 of the preprocessing unit 10 will be described. This sort key adding section 13 generates sort keys indicative of the desired order of records and adds the sort keys to the records. In other words, after data in the input file 60 are divided into blocks with the multiple keys selected by the key selection section 12, it is desired that the blocks be so arranged that they can be processed efficiently and data in each block be sorted with a specific key. Therefore, the sort key adding section 13 couples a value indicative of the order of blocks (hereinafter called "block's ordinal value") with the key value of a key used to sort data in a block (hereinafter called "intra-block key value") to create a sort key, and adds the sort key to each record. Here, the block's ordinal value is an example of sequence information indicative of the order of blocks.

Figure 5:
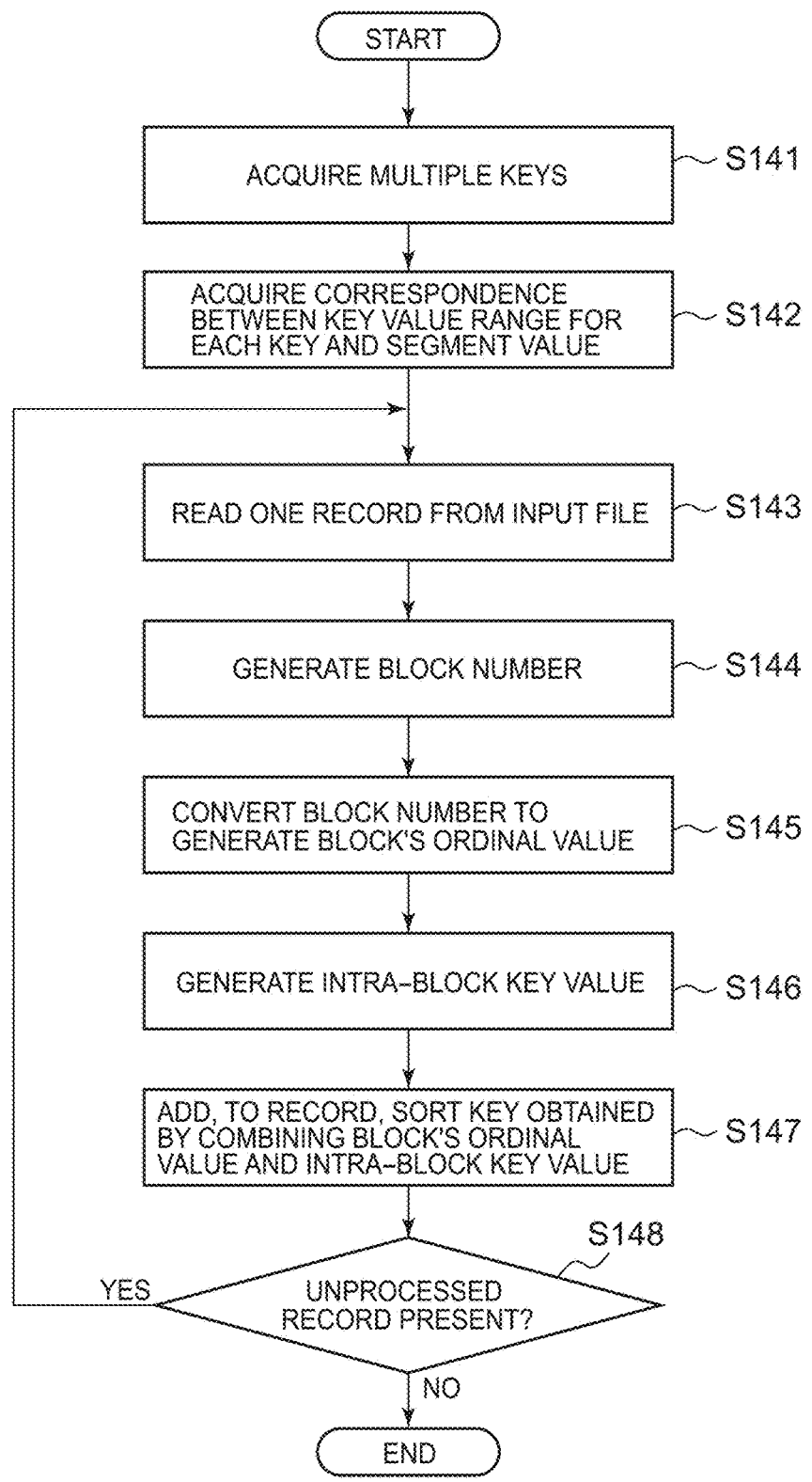
FIG. 5 is a flowchart showing an example operation of a sort key adding section of the preprocessing unit in the bulk data processing system of embodiments of the present invention.

FIG. 5 is a flowchart showing an example operation of the sort key adding section 13, according to embodiments of the present invention.

First, the sort key adding section 13 acquires the multiple keys from the key selection section 12 (step 141).

The sort key adding section 13 also acquires a correspondence between the range of key values for each key and a segment value from information stored by the segmenting section 11 in the storage device 50 (step 142).

Next, the sort key adding section 13 reads one record from the input file 60 (step 143).

Further, the sort key adding section 13 refers to the information on segment values corresponding to the multiple keys for the record acquired in step 142 and determines the segment values to generate block numbers (step 144). For example, if there are three keys, the block numbers is like "000," "001," and "002."

However, if the blocks are arranged simply in order of block number, a block following a block with block number "099" will be block number "100." In other words, multiple segment values may vary between adjacent blocks, and this disables the underlying operation in the embodiment. Therefore, in the embodiment, the arrangement of blocks is devised and the block's ordinal value indicative of the order of blocks in the devised arrangement is generated from the block number to be used as a sort key.

In this case, the blocks are so arranged that only one segment value in block numbers between adjacent blocks varies. For example, suppose that there are three keys and the number of segments for each key is "10." In this case, as shown in FIG. 1B, the blocks can be so arranged that the third segment value is incremented one by one, and after completing a round, the second segment value is incremented. Note that when the left-hand segment value is incremented, the right-hand segment value is not changed.

In order to achieve such an arrangement, the sort key adding section 13 uses the inverse mapping, of a mapping for converting a block's ordinal value into a block number, to calculate the block's ordinal value from the block number (step 145). Specifically, the block's ordinal value is calculated by the following equation. In the following equation, a coset representative for the number of segments as the law is calculated, and the value corresponding to the i-th key of the block's ordinal value from the left is expressed as "ordinal value i."

$$(\text{Ordinal Value 1 Ordinal Value 2 } \ldots \text{ Ordinal Value } n) =$$
$$(\text{Segment Value 1 Segment Value 2 } \ldots \text{ Segment Value } n) \begin{pmatrix} 1 & 1 & \ldots & 1 \\ 0 & 1 & \ldots & 1 \\ \ldots & \ldots & \ldots & \ldots \\ 0 & 0 & \ldots & 1 \end{pmatrix}$$

[Equation 3]

Thus, for example, block number "019" is converted to block's ordinal value "010" and block number "010" is converted to block's ordinal value "011." The sorting section 14 uses the converted value as a sort key indicative of the order of blocks to sort data in the input file 60 so that a desired block arrangement can be realized.

As mentioned above, the blocks are so set that only one segment value in block numbers between adjacent blocks varies. In bulk data processing, reading of table data corresponding to a key the segment value of which is not changed is buffer-hit, while table data corresponding to a key the segment value of which is changed is read from a disk. Therefore, the key corresponding to the changed segment value is used to sort data in a block so that data will be sequentially read from a disk in bulk data processing.

For example, when the block number of a block is "009" and the block number of the subsequent block is "019," since data corresponding to segment values of the second key are read in the latter block from tables in the DB 40, it is desired to sort data with the second key so that this reading will be sequential. To this end, in the block with block number "019," the key value of the second key in data is used as an intra-block key value.

Here, an intra-block key position as the position of an ordinal value in the block's ordinal value and corresponding to a key used for sorting in a block (hereinafter called "intra-block key") can be decided using the following equation from the block's ordinal value obtained by converting a block number. In this equation, as above, the value corresponding to the i-th key of the block's ordinal value from the left is also expressed as "ordinal value i."

$$\text{Intra-Block Key Position} = \{k | (\text{Ordinal Value } k > 0)^\wedge (\forall m > k, \text{Ordinal Value } m = 0)\}$$ [Equation 4]

In other words, the sort key adding section 13 decides on a key used as an intra-block key, copies the key value of the key to generate the intra-block key value (step 146).

Then, the sort key adding section 13 combines the block's ordinal value generated in step 145 with the intra-block key value generated in step 146 to generate a sort key, and adds the sort key to the record read in step 143 (step 147).

After that, the sort key adding section 13 determines whether there is any unprocessed record (step 148). If there is any unprocessed record, the procedure returns to step 143 to add a sort key to the next record. This is repeated until it is determined in step 148 that there is no unprocessed record. Thus, the sort keys composed of the block's ordinal values and the intra-block key values are added to all the records, and output as the input file 70 with sort key.

FIG. 6 shows an example of data in the input file 70 with sort key, according to embodiments of the present invention.

As shown, data in the input file 70 with sort key are data obtained by adding sort keys to record data originally included in the input file 60. Then, the sort keys include the block's ordinal values and the intra-block key values, and the record data includes the values of multiple keys.

Here, it is assumed that a correspondence between the key value range and the segment value for any key is as shown in FIG. 1A.

Then, for example, the block number of a block in the first line is "346." This is converted in step 145 so that the block's ordinal value will be "373." Then, in step 146, since the intra-block key position is "3," the intra-block key value is "6860."

Further, for example, the block number of a block in the third line is "316." This is converted in step 145 so that the block's ordinal value will be "340." Then, in step 146, since the intra-block key position is "2," the intra-block key value is "1211."

Further, for example, the block number of a block in the ninth line is "460." This is converted in step 145 so that the block's ordinal value will be "400." Then, in step 146, since the intra-block key position is "1," the intra-block key value is "4858."

Fourthly, the operation of the sorting section 14 of the preprocessing unit 10 will be described. This sorting section 14 sorts all records in the input file 60 using sort keys added to the records by the sort key adding section 13. In other words, since the sort key consisting of the block's ordinal value and the intra-block key value is added to each record, the sorting section 14 uses this sort key to sort data in ascending order.

This sort is the same as general sort in the sense that data are sorted in ascending order using a specific key for the data. Therefore, this sort may be done by developing a program using a known sort algorithm and running the program, or using an existing sort utility.

Then, as a result of sorting, the sorting section 14 outputs the sorted input file 80 including data arranged in order so that the bulk data processing can be performed efficiently.

Although the sort key is added to each record in the sorted input file 80, this sort key is not necessary for the bulk data processing after completion of the sort. Therefore, the bulk data processing unit 20 may skip the sort key when reading data in the sorted input file 80, or delete the sort key during the sort or after completion of the sort so that the sort key will not be included in the sorted input file 80.

Fifthly, the operation of the bulk data processing unit 20 will be described. As a result of special sorting in the preprocessing unit 10, the data are arranged in the sorted input file 80 as follows:

The set of segment values of keys is the same in a block.
Only one segment value of a key is different from that in an adjacent block.
In a block, data are sorted with a key different in segment value from the previous block. For example, when blocks with block number "099," block number "090," and block number "190" are arranged in this order, data in the block with block number "090" are sorted with the third key, and data in the block with block number "190" are sorted with the first key.

The bulk data processing unit 20 reads data in the sorted input file 80 sequentially to perform bulk data processing. As a result, data in tables corresponding to a key the segment value of which is changed are read sequentially, while data in tables corresponding to a key the segment value of which is not changed are buffer-hit because the data have been read in a buffer pool at the time of the previous block processing. Thus, in both cases, data are processed at high speed.

Figure 7A:
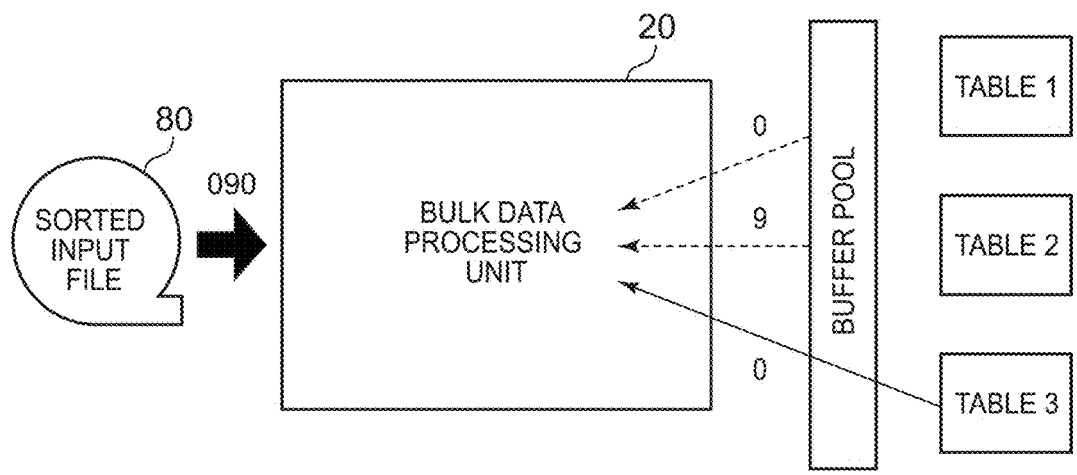
FIGS. 7A and 7B are diagrams for describing the operation of a bulk data processing unit in the bulk data processing system of embodiments of the present invention.
Figure 7B:
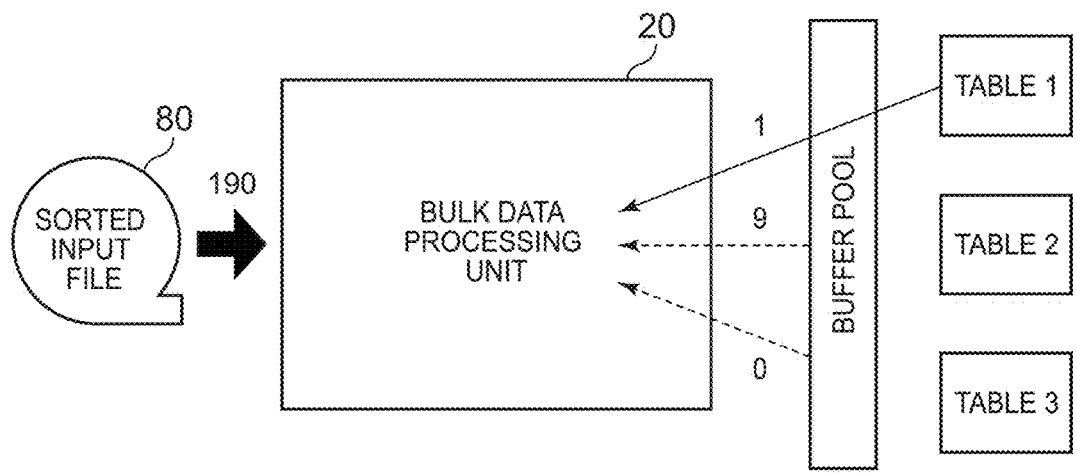

FIGS. 7A and 7B are diagrams for describing the operation of a bulk data processing unit in the bulk data processing system of embodiments of the present invention.

FIG. 7A is an example of processing the block with block number "090" after processing the block with block number "099," and FIG. 7B is an example of processing the block with block number "190" after that, according to embodiments of the present invention. It is assumed that among the segment values that form a block number, the first segment value from the left is a segment value for the key of table 1, the second segment value from the left is a segment value for the key of table 2, and the third segment value from the left is a segment value for the key of table 3.

In FIG. 7A, the bulk data processing unit 20 first reads data in the block with block number "090" from the sorted input file 80.

Next, the bulk data processing unit 20 accesses table 1. In this case, the segment value for the key of table 1 is not changed from that of the previous block. It means that the data in table 1 are stored in the buffer pool and hence can be processed at high speed.

The bulk data processing unit 20 also accesses table 2. In this case, the segment value for the key of table 2 is not changed from that of the previous block. It means that the data in table 2 are stored in the buffer pool and hence can be processed at high speed.

Further, the bulk data processing unit 20 accesses table 3. In this case, since the segment value for the key of table 3 is changed from that of the previous block, data in the block have been sorted with this key. Therefore, data in table 3 are read sequentially from the DB 40, and hence can be processed at high speed.

In FIG. 7B, the bulk data processing unit 20 first reads data in the block with block number "190" from the sorted input file 80.

Next, the bulk data processing unit 20 accesses table 1. In this case, since the segment value for the key of table 1 is changed from that of the previous block, data in the block have been sorted with this key. Therefore, the data in table 1 are read sequentially from the DB 40, and hence can be processed at high speed.

The bulk data processing unit 20 also accesses table 2. In this case, the segment value for the key of table 2 is not changed from that of the previous block. Therefore, the data in table 2 are stored in the buffer pool, and hence can be processed at high speed.

Further, the bulk data processing unit 20 accesses table 3. In this case, the segment value for the key of table 3 is not changed from that of the previous block. Therefore, the data in table 3 are stored in the buffer pool and hence can be processed at high speed.

Here, FIG. 8 shows an example of transition of methods for accessing a table in the bulk data processing when data in the input file 60 are sorted, according to embodiments of the present invention.

Only for the first block, key 1 and key 2 are not targeted. Therefore, since access to table 1 using key 1 and access to table 2 using key 2 are random access, it takes processing time, but data in the second block and beyond are all read sequentially or buffer-hit, and hence can be processed at high speed.

The above has described the embodiment.

Thus, in the embodiment, the order of data input to bulk data processing is changed. This speeds up access to multiple tables in the bulk data processing, improving processing performance.

Further, in the embodiment, input data in the bulk data processing is subjected to special sorting beforehand. This can speed up the bulk data processing without changing the application logic of the bulk data processing.

The special sorting has the following effects:

First, input data are divided into blocks using sets of segment values for the multiple keys, and the keys used for sorting are changed on a block-by-block basis. This enables sequential data reading from tables to be sorted using the keys.

Secondly, key values are divided into segments according to the buffer size of the tables. Thus, when the segment values for keys are the same between adjacent blocks, the buffer is hit.

Thirdly, the blocks are so arranged that only a segment value corresponding to one key among multiple segment values is changed. This enables data to be read from tables through either sequential access or buffer hit.

Fourthly, a set of the maximum number of keys that allow the page-sequential operation are automatically selected from the information on tables and the number of input records. This can result in improvement in performance according to the number of input records.

In the embodiment, a sort key is added to each record in the input file 60, but a configuration in which no sort key is added to each record may also be employed. For example, a sort key may be associated with each record and stored in another memory separately from the input file 60 to sort the records in the input file 60 based on the sort keys held in this memory.

Figure 9:
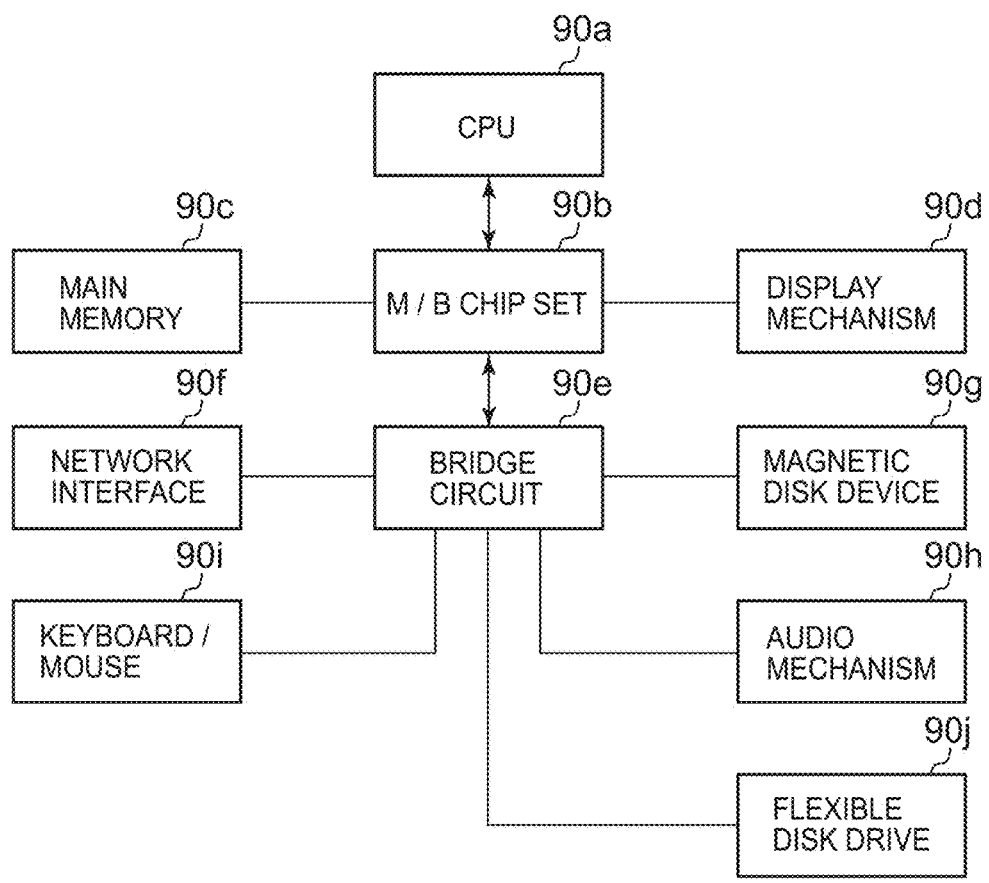
FIG. 9 is a diagram showing a hardware configuration of a computer to which embodiments of the present invention can be applied.

Finally, the hardware configuration of a computer to which the embodiment is suitably applied will be described. FIG. 9 is a diagram showing an example of the hardware configuration of such a computer, according to embodiments of the present invention. As shown, the computer includes the CPU (Central Processing Unit) 90*a* as computing means, the main memory 90*c* connected to the CPU 90*a* through a M/B (motherboard) chip set 90*b*, and a display mechanism 90*d* connected to the CPU 90*a* through the M/B chip set 90*b* as well. A network interface 90*f*, the magnetic disk device (HDD) 90*g*, an audio mechanism 90*h*, the keyboard/mouse 90*i*, and a flexible disk drive 90*j* are connected to the M/B chip set 90*b* through a bridge circuit 90*e*.

In FIG. 9, each component is connected through a bus. For example, the CPU 90*a* and the M/B chip set 90*b*, and the M/B chip set 90*b* and the main memory 90*c* are connected through a CPU bus. The M/B chip set 90*b* and the display mechanism 90*d* may be connected through an AGP (Accelerated Graphics Port), but when the display mechanism 90*d* includes a PCI Express-compatible video card, the M/B chip set 90*b* and this video card are connected through a PCI Express (PCIe) bus. When being connected to the bridge circuit 90*e*, the network interface 90*f* can use PCI Express, for example. In regard to the magnetic disk device 90*g*, for example, serial ATA (AT Attachment), parallel transfer ATA, or PCI (Peripheral Components Interconnect) can be used. Further, in regard to the keyboard/mouse 90*i* and the flexible disk drive 90*j*, USB (Universal Serial Bus) can be used.

Here, the present invention may be implemented in hardware or in software. It can also be implemented in both hardware and software. Further, the present invention can be implemented as a computer, a data processing system, or a computer program. This computer program can be computer code stored on a computer-readable physically tangible medium and configured to be executed by a processor of a computer system via a memory unit. The computer-readable physically tangible medium may be an electronic, magnetic, optical, infrared or semiconductor system (e.g., tangible device or equipment), etc. Further, as the computer-readable medium, a semiconductor or solid-state storage device, a magnetic tape, a removable computer diskette, a random access memory (RAM), a read-only memory (ROM), a rigid magnetic disk, and an optical disk are exemplified. Examples of optical disks so far include compact disk read-only memory (CD-ROM), compact disk read/write (CD-R/W), and DVD.

A computer program product of the present invention may comprise a computer readable tangible storage medium having a computer readable program code stored therein, said program code configured to be executed by a processor of a computer system to implement a method, or methods, of the present invention.

A computer system of the present invention may comprise a processor, a memory unit, and a computer readable tangible storage medium, said storage medium containing program code configured to be executed by the processor via the memory unit to implement a method, or methods, of the present invention.

Figure 10:
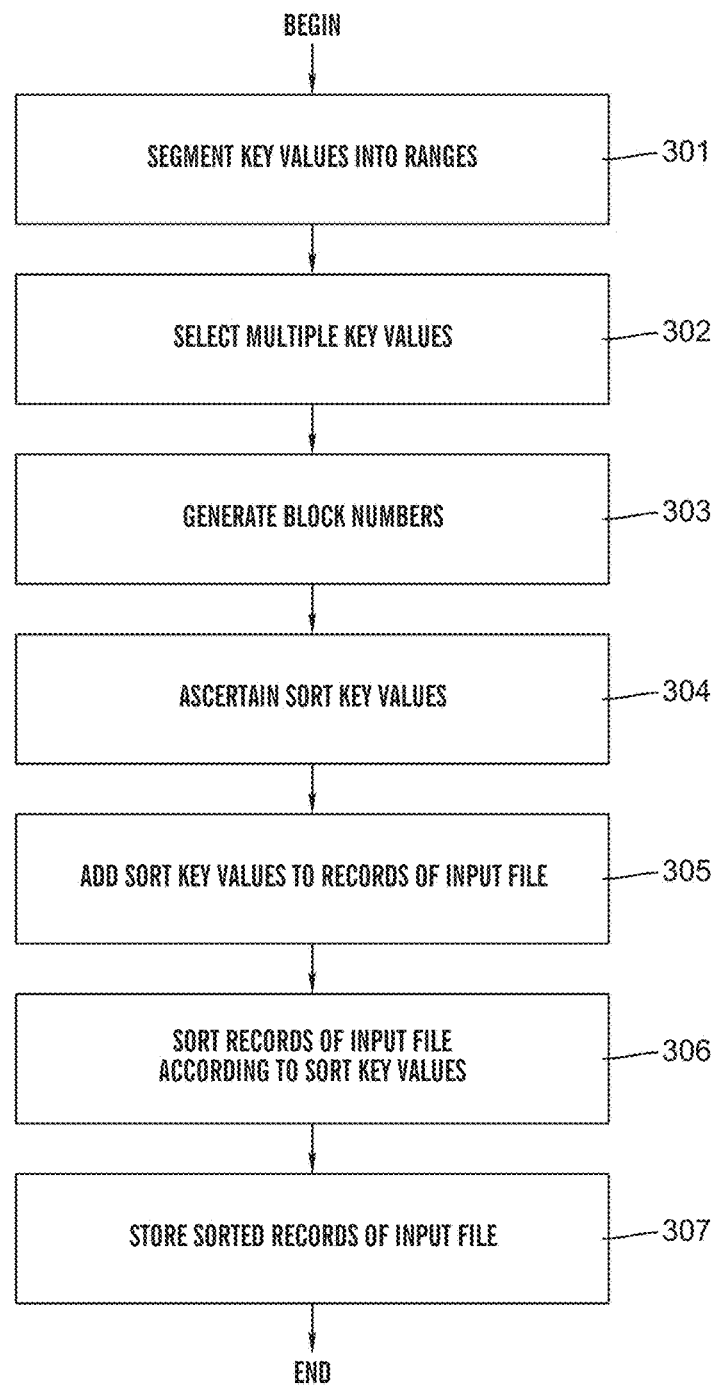
FIG. 10 is a flow chart depicting a method for sorting data of an input file stored on a first tangible storage device, in accordance with embodiments of the present invention.

FIG. 10 is a flow chart depicting a method for sorting data of an input file stored on a first tangible storage device, in accordance with embodiments of the present invention. The input file comprises multiple records associated with multiple tables of a database. Each record of the multiple records comprises a plurality of key values. The method depicted in FIG. 10 includes steps 301-307.

Step 301 segments the plurality of key values in the multiple records associated with each table into ranges of key values for each table. Each range of key values for each table is denoted as a segment having an associated segment value.

Step 302 selects multiple key values for each record of the multiple records. The multiple key values are selected in association with the tables of the multiple tables.

In one embodiment, selection of multiple key values selects all key values that satisfy a condition for determining that the data in the multiple tables are readable sequentially. The condition may be: a total number of records in the input file/(number of segments 1×number of segments 2× . . . ×number of segments n)>max(number of records in table i/number of segments i)/coefficient, wherein n is a total number of tables of the multiple tables; wherein the multiple tables are denoted as table 1, table 2, . . . , table n; wherein said number of segments i denotes the total number of segments for table i (i=1, 2, . . . , n); wherein max(number of records in table i/number of segments i) denotes a maximum value of (number of records in table i/number of segments i) over i=1, 2, . . . , n; wherein coefficient is a number of pages from a page read immediately before a currently read page is handled as page-sequential; and wherein page denotes a unit of storing data on the first tangible storage device.

Step 303 generates, for each record of the multiple records, a block number comprising a unique permutation of the segment values of the segments. The segment values respectively denote the ranges of key values encompassing the multiple key values.

Step 304 ascertains, for each record of the multiple records, a sort key value based on the generated block number for each record of the multiple records.

Step 305 adds to each record of the multiple records, the sort key value ascertained for each record of the multiple records.

After adding the sort key value to all records of the multiple records in step 305, step 306 sorts the multiple records according to the sort key values added to the multiple records.

Step 307 stores the sorted multiple records in an output file on a second tangible storage device. The second tangible storage device and the first tangible storage device may be the same tangible storage device or different tangible storage devices.

In one embodiment, the sort key value for each record of the multiple records is deleted during or after the sorting in step 306, which results in the sort key value for each record of the multiple records not being included in the sorted multiple records in the output file.

In one embodiment, each key value of the multiple key values of each record of the multiple records is associated with a different table of the multiple tables.

Figure 11:
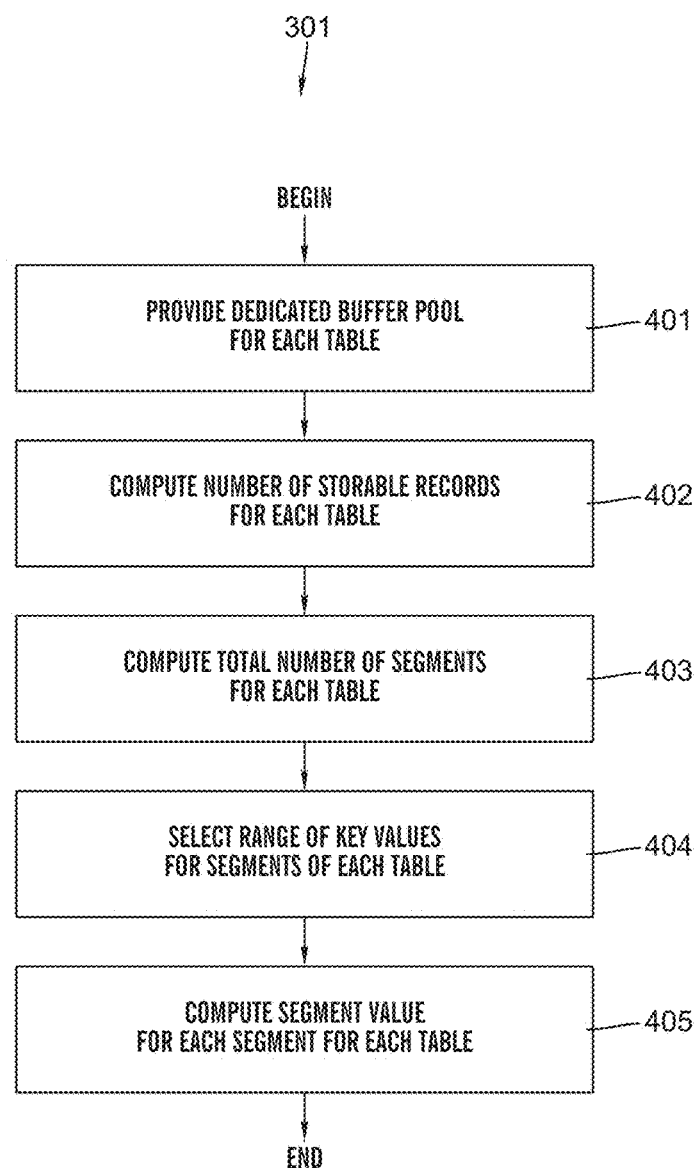
FIG. 11 is a flow chart depicting an embodiment of a segmenting step in FIG. 10 in which a plurality of key values is segmented into ranges of key values, in accordance with embodiments of the present invention.

FIG. 11 is a flow chart depicting an embodiment of a segmenting step in FIG. 10 in which a plurality of key values is segmented into ranges of key values, in accordance with embodiments of the present invention. The method depicted in FIG. 11 includes steps 401-405 in FIG. 11.

Step 401 provides a dedicated buffer pool for each table.

Step 402 computes a number of storable records for each table as equal to a size of the dedicated buffer pool for each table divided by a record length of each record of each table.

Step 403 computes a total number of segments for each table as equal to a total number of records of each table divided by the computed number of storable records for each table.

After computing the total number of segments for each table in step 403, step 404 selects the range of key values for the segments of each table in a manner that uniformly distributes the plurality of key values among the segments of each table.

Step 405 computes a segment value for each segment for each table as being equal to a product divided by a divisor, wherein the computed segment value is rounded down to a next lower integer if the computed segment value is not an integer. The product is a product of the calculated number of segments for each table and a difference between a highest key value in each segment and a lowest key value of the plurality of key values. The divisor is one plus a difference between a highest key value of the plurality of key values and the lowest key value of the plurality of key values.

Figure 12:
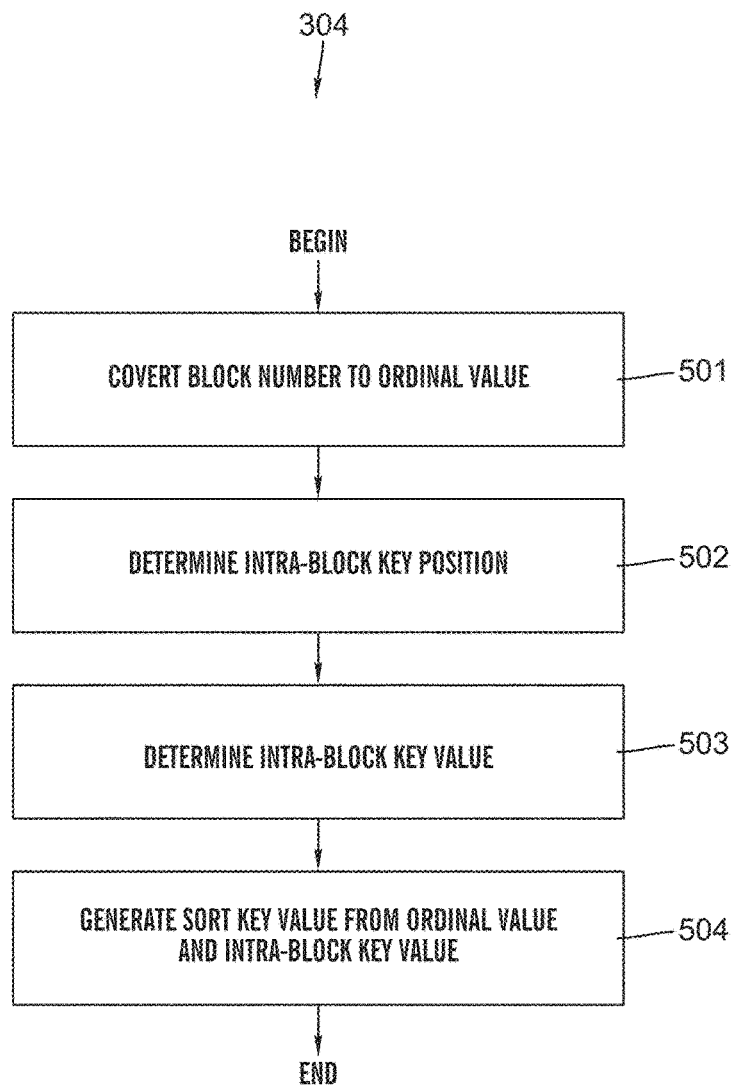
FIG. 12 is a flow chart depicting an embodiment of a step in FIG. 10 in which a sort key value is ascertained for each record, in accordance with embodiments of the present invention.

FIG. 12 is a flow chart depicting an embodiment of step 304 of FIG. 10 in which a sort key value is ascertained for each record, based on the generated block number for each record, in accordance with embodiments of the present invention. The generated block numbers collectively constitute multiple block numbers, wherein the method of FIG. 10 further comprises sequencing the block numbers of the multiple block numbers in a block sequence such that the segment value differs in only one position within the unique permutation of the segment values in each pair of successive blocks in the block sequence, and wherein said ascertaining the sort key value for each record in step 304 includes steps 501-504 in FIG. 12.

Step 501 converts the generated block number for each record to an ordinal value denoting a sequential position of the generated block number within the block sequence.

Step 502 determines an intra-block key position, within the unique permutation of the segment values of the generated block for each record, as being the only one position at which the segment value differs from the segment value in the block immediately preceding the generated block in the block sequence.

Step 503 determines an intra-block key value as being the key value of the multiple key values of each record at the segment associated with the intra-block key position.

Step 504 generates the sort key value for each record from a combination of the ordinal value and the intra-block key value. While the present invention has been described with respect to the embodiment, the technical scope of the present invention is not limited to the aforementioned embodiment. It will be obvious to those skilled in the art that various changes and modifications can be made without departing from the sprit and scope of the present invention.

What is claimed is:

1. A method for sorting data of an input file comprising multiple records associated with multiple tables of a database, each record of the multiple records comprising a plurality of key values, said method comprising:

segmenting, by a processor of a computer system, the plurality of key values in the multiple records associated with each table into ranges of key values for each table, each range of key values for each table denoted as a segment having an associated segment value, wherein the input file is stored on a first tangible storage device;

said processor generating, for each record of the multiple records, a block number denoting a unique permutation of the segment values of the segments, said segment values respectively denoting the ranges of key values encompassing multiple key values selected for each record in association with the tables of the multiple tables;

said processor ascertaining, for each record of the multiple records, a sort key value based on the generated block number for each record of the multiple records;

said processor adding, to each record of the multiple records, the sort key value ascertained for each record of the multiple records;

said processor sorting the multiple records according to the sort key values added to each record of the multiple records; and said processor storing the sorted multiple records in an output file on a second tangible storage device.

2. The method of claim 1, wherein the generated block numbers collectively constitute multiple block numbers, wherein the method further comprises sequencing the block numbers of the multiple block numbers in a block sequence such that the segment value differs in only one position within the unique permutation of the segment values in each pair of successive blocks in the block sequence.

3. The method of claim 2, wherein said ascertaining the sort key value for each record of the multiple records comprises:

converting the generated block number for each record of the multiple records to an ordinal value denoting a sequential position of the generated block number within the block sequence;

determining an intra-block key position, within the unique permutation of the segment values of the generated block for each record of the multiple records, as being said only one position at which the segment value differs from the segment value in the block immediately preceding the generated block in the block sequence;

determining an intra-block key value as being the key value of the multiple key values of each record of the multiple records at the segment associated with the intra-block key position; and generating the sort key value for each record of the multiple records from a combination of the ordinal value and the intra-block key value.

4. The method of claim 1, wherein said segmenting comprises:

providing a dedicated buffer pool for each table of the multiple tables;

computing a number of storable records for each table as equal to a size of the dedicated buffer pool for each table divided by a record length of each record of each table;

computing a total number of segments for each table as equal to a total number of records of each table divided by the computed number of storable records for each table;

after said computing the total number of segments for each table, selecting the range of key values for the segments of each table in a manner that uniformly distributes the plurality of key values among the segments of each table; and computing a segment value for each segment for each table as being equal to a product divided by a divisor, said computed segment value rounded down to a next lower integer if the computed segment value is not an integer, said product being a product of the calculated number of segments for each table and a difference between a highest key value in each segment and a lowest key value from the ranges of key values, said divisor being an increment between successive key values plus a difference between a highest key value from the ranges of key values and the lowest key value from the ranges of key values.

5. The method of claim 4, wherein the selected multiple key values include all key values that satisfy a condition for determining that the data in the multiple tables are readable sequentially;

wherein the condition is: a total number of records in the input file/(number of segments 1×number of segments 2× . . . ×number of segments n)>max(number of records in table i/number of segments i)/coefficient;

wherein n is a total number of tables of the multiple tables;

wherein the multiple tables are denoted as table 1, table 2, . . . , table n;

wherein said number of segments i denotes the total number of segments associated with each table i (i=1, 2, . . . , n);

wherein max(number of records in table i/number of segments i) denotes a maximum value of (number of records in table i/number of segments i) over i=1, 2, . . . , n;

wherein coefficient is a number of pages from a page read immediately before a currently read page is handled as page-sequential; and wherein page denotes a unit of storing data on the first tangible storage device.

6. The method of claim 1, wherein each key value of the multiple key values of each record of the multiple records is associated with a different table of the multiple tables.

7. A computer program product, comprising a computer readable hardware storage device having a computer readable program code stored therein, said program code configured to be executed by a processor of a computer system to implement a method for sorting data of an input file comprising multiple records associated with multiple tables of a database, each record of the multiple records comprising a plurality of key values, said method comprising:

said processor segmenting the plurality of key values in the multiple records associated with each table into ranges of key values for each table, each range of key values for each table denoted as a segment having an associated segment value, wherein the input file is stored on a first tangible storage device;

said processor generating, for each record of the multiple records, a block number denoting a unique permutation of the segment values of the segments, said segment values respectively denoting the ranges of key values encompassing multiple key values selected for each record in association with the tables of the multiple tables;

said processor ascertaining, for each record of the multiple records, a sort key value based on the generated block number for each record of the multiple records;

said processor adding the ascertained sort key value to each record of the multiple records;

said processor sorting the multiple records according to the sort key values added to each record of the multiple records; and said processor storing the sorted multiple records in an output file on a second tangible storage device.

8. The computer program product of claim 7, wherein the generated block numbers collectively constitute multiple block numbers, wherein the method further comprises sequencing the block numbers of the multiple block numbers in a block sequence such that the segment value differs in only one position within the unique permutation of the segment values in each pair of successive blocks in the block sequence.

9. The computer program product of claim 8, wherein said ascertaining the sort key value for each record of the multiple records comprises:

converting the generated block number for each record of the multiple records to an ordinal value denoting a sequential position of the generated block number within the block sequence;

determining an intra-block key position, within the unique permutation of the segment values of the generated block for each record of the multiple records, as being said only one position at which the segment value differs from the segment value in the block immediately preceding the generated block in the block sequence;

determining an intra-block key value as being the key value of the multiple key values of each record of the multiple records at the segment associated with the intra-block key position; and generating the sort key value for each record of the multiple records from a combination of the ordinal value and the intra-block key value.

10. The computer program product of claim 7, wherein said segmenting comprises:

providing a dedicated buffer pool for each table of the multiple tables;

computing a number of storable records for each table as equal to a size of the dedicated buffer pool for each table divided by a record length of each record of each table;

computing a total number of segments for each table as equal to a total number of records of each table divided by the computed number of storable records for each table;

after said computing the total number of segments for each table, selecting the range of key values for the segments of each table in a manner that uniformly distributes the plurality of key values among the segments of each table; and computing a segment value for each segment for each table as being equal to a product divided by a divisor, said computed segment value rounded down to a next lower integer if the computed segment value is not an integer, said product being a product of the calculated number of segments for each table and a difference between a highest key value in each segment and a lowest key value from the ranges of key values, said divisor being an increment between successive key values plus a difference between a highest key value from the ranges of key values and the lowest key value from the ranges of key values.

11. The computer program product of claim 7, wherein the selected multiple key values include all key values that satisfy a condition for determining that the data in the multiple tables are readable sequentially;

wherein the condition is: a total number of records in the input file/(number of segments 1×number of segments 2× . . . ×number of segments n)>max(number of records in table i/number of segments i)/coefficient;

wherein n is a total number of tables of the multiple tables;

wherein the multiple tables are denoted as table 1, table 2, . . . , table n; wherein said number of segments i denotes the total number of segments associated with each table i (i=1, 2, . . . , n);

wherein max(number of records in table i/number of segments i) denotes a maximum value of (number of records in table i/number of segments i) over i=1, 2, . . . , n;

wherein coefficient is a number of pages from a page read immediately before a currently read page is handled as page-sequential; and wherein page denotes a unit of storing data on the first tangible storage device.

12. The computer program product of claim 7, wherein each key value of the multiple key values of each record of the multiple records is associated with a different table of the multiple tables.

13. A computer system comprising a processor, a memory unit, and a computer readable hardware storage device, said storage device containing program code configured to be executed by the processor via the memory unit to implement a method for sorting data of an input file comprising multiple records associated with multiple tables of a database, each record of the multiple records comprising a plurality of key values, said method comprising:

said processor segmenting the plurality of key values in the multiple records associated with each table into ranges of key values for each table, each range of key values for each table denoted as a segment having an associated segment value, wherein the input file is stored on a first tangible storage device;

said processor generating, for each record of the multiple records, a block number denoting a unique permutation of the segment values of the segments, said segment values respectively denoting the ranges of key values encompassing multiple key values selected for each record in association with the tables of the multiple tables;

said processor ascertaining, for each record of the multiple records, a sort key value based on the generated block number for each record of the multiple records;

said processor adding the ascertained sort key value to each record of the multiple records;

said processor sorting the multiple records according to the sort key values added to each record of the multiple records; and said processor storing the sorted multiple records in an output file on a second tangible storage device.

14. The computer system claim 13, wherein the generated block numbers collectively constitute multiple block numbers, wherein the method further comprises sequencing the block numbers of the multiple block numbers in a block sequence such that the segment value differs in only one position within the unique permutation of the segment values in each pair of successive blocks in the block sequence.

15. The computer system claim 14, wherein said ascertaining the sort key value for each record of the multiple records comprises:

converting the generated block number for each record of the multiple records to an ordinal value denoting a sequential position of the generated block number within the block sequence;

determining an intra-block key position, within the unique permutation of the segment values of the generated block for each record of the multiple records, as being said only one position at which the segment value differs from the segment value in the block immediately preceding the generated block in the block sequence;

determining an intra-block key value as being the key value of the multiple key values of each record of the multiple records at the segment associated with the intra-block key position; and generating the sort key value for each record of the multiple records from a combination of the ordinal value and the intra-block key value.

16. The computer system claim 13, wherein said segmenting comprises:

providing a dedicated buffer pool for each table of the multiple tables;

computing a number of storable records for each table as equal to a size of the dedicated buffer pool for each table divided by a record length of each record of each table;

computing a total number of segments for each table as equal to a total number of records of each table divided by the computed number of storable records for each table;

after said computing the total number of segments for each table, selecting the range of key values for the segments of each table in a manner that uniformly distributes the plurality of key values among the segments of each table; and computing a segment value for each segment for each table as being equal to a product divided by a divisor, said computed segment value rounded down to a next lower integer if the computed segment value is not an integer, said product being a product of the calculated number of segments for each table and a difference between a highest key value in each segment and a lowest key value from the ranges of key values, said divisor being an increment between successive key values plus a difference between a highest key value from the ranges of key values and the lowest key value from the ranges of key values.

17. The computer system claim 16, wherein the selected multiple key values include all key values that satisfy a condition for determining that the data in the multiple tables are readable sequentially;

wherein the condition is: a total number of records in the input file/(number of segments 1×number of segments 2× . . . ×number of segments n)>max(number of records in table i/number of segments i)/coefficient;

wherein n is a total number of tables of the multiple tables;

wherein the multiple tables are denoted as table 1, table 2, . . . , table n;

wherein said number of segments i denotes the total number of segments associated with each table i (i=1, 2, . . . , n);

wherein max(number of records in table i/number of segments i) denotes a maximum value of (number of records in table i/number of segments i) over i=1, 2, . . . , n;

wherein coefficient is a number of pages from a page read immediately before a currently read page is handled as page-sequential; and wherein page denotes a unit of storing data on the first tangible storage device.

18. The method of claim 1, wherein the multiple tables comprise at least three tables.

19. The computer program product of claim 7, wherein the multiple tables comprise at least three tables.

20. The computer system of claim 13, wherein the multiple tables comprise at least three tables.

* * * * *